United States Patent [19]

Trine et al.

[11] Patent Number: 5,342,210
[45] Date of Patent: Aug. 30, 1994

[54] CONNECTOR FOR A BAR CODE SCANNER

[75] Inventors: David R. Trine, Seattle; David W. Gilpin, Everett, both of Wash.

[73] Assignee: Intermec Corporation, Everett, Wash.

[21] Appl. No.: 26,265

[22] Filed: Mar. 4, 1993

Related U.S. Application Data

[63] Continuation of Ser. No. 859,043, Mar. 26, 1992, abandoned.

[51] Int. Cl.⁵ .......................................... H01R 13/652
[52] U.S. Cl. ...................................................... 439/95
[58] Field of Search .................. 235/472; 382/59; 439/95, 96, 181, 186, 696, 885

[56] References Cited

U.S. PATENT DOCUMENTS

| | | | |
|---|---|---|---|
| 4,470,648 | 9/1984 | Davis et al. | 439/95 |
| 4,738,638 | 4/1988 | Bogese, II | 439/676 |
| 4,875,863 | 10/1989 | Reed | 439/676 |

Primary Examiner—Gary F. Paumen
Attorney, Agent, or Firm—Seed and Berry

[57] ABSTRACT

A connector for connecting internal circuitry of a bar code scanner to a connector plug. One end of a contact assembly is used together with a scanner chassis to form a receptacle for receiving the plug. The other end of the contact assembly connects with the internal circuitry. The contact assembly includes a plurality of wires with a ground wire that is bent to contact a scanner casing upon insertion of the contact assembly into the scanner casing. Two or more of the wires have lateral protrusions extending toward each other to provide points at which arcing is most likely in the event of an increased surge of current. One of the wires with the protrusions is also the wire that is bent outward so that any arcing is grounded to the scanner casing.

11 Claims, 3 Drawing Sheets

CONNECTOR FOR A BAR CODE SCANNER

CROSS-REFERENCE TO RELATED APPLICATION

This application is a continuation of U.S. patent application Ser. No. 07/859,043, filed Mar. 26, 1992, now abandoned.

FIELD OF THE INVENTION

This invention relates to bar code scanners and, more particularly, to an assembly for making connections to the internal electric circuit of the bar code scanner.

BACKGROUND OF THE INVENTION

Virtually anyone who has been in a grocery store, a department store, or any other type of business within the last ten years has seen the ubiquitous bar code scanners. Bar code scanners come in basically two types: stationary bar code scanners and hand-held scanners. Both types of scanners operate in basically the same way. Light reflected off of the bar is converted into an electrical signal indicative of the distance between each bar of the bar code. The electrical signal is sent to a processor where it is decoded by comparing it with a known signal indicative of a known bar code.

Although the processor may be contained within the hand-held scanner, it is often the case that the electrical signal must be sent to a processor that is remote from the scanner. To insure that the signal is accurately sent to the remote processor, it is important that the connection to the circuit inside the scanner be a secure one. This can be accomplished is by welding connecting wires directly to the circuit board with the other end of the wires connected directly to the processor. While this might provide a secure connection, the permanence of the connection provides problems of its own. It is often useful to disconnect the bar code scanner from the processor for repair or replacement of the scanner. It may also be useful to use the same scanner with several processors, or to use several scanners with one processor. This requires that the scanner be easily disconnected from the processor without having to re-solder or re-splice the connection.

Prior art scanners suffer the additional problem that they are relatively complicated to assemble. This complication requires the scanners to be assembled by hand. Such hand labor adds time, human error and high labor costs to the assembly, resulting in an expensive product. The cost of the product can be greatly reduced if the components can be assembled by automation.

Given the small confines of a pen-sized scanner, it is unavoidable that the connecting wires used in the circuit are very closely spaced. When wires are so closely spaced a surge of electricity in one wire can cause arcing between wires. Such arcing can cause the scanner to be shorted out and damaged beyond repair.

SUMMARY OF THE INVENTION

The present invention provides a connector for a bar code scanner that is both secure and easy to assemble. The inventive connector allows the bar code scanner to be easily disconnected from and reconnected to its power supply and communication cable. The invention also provides protection against destructive arcing between connection wires in the scanner.

The inventive connector includes a scanner circuit and a contact assembly mounted on a scanner chassis. The parts of the connector are modular and are assembled linearly so that assembly can be performed by automation. The contact assembly includes a plurality of wires retained by a wire support member. The wires are held together during assembly by end tabs that are easily removed after the wires are retained by the wire support member. One end of the wires is connected to the scanner circuit board while the other end of the wires combines with the scanner chassis to form a receptacle for an external connection plug. One of the wires is a ground wire having protrusions extending toward an adjacent wire such that any arcing occurs at the protrusions.

DETAILED DESCRIPTION OF THE INVENTION

Figure 1:
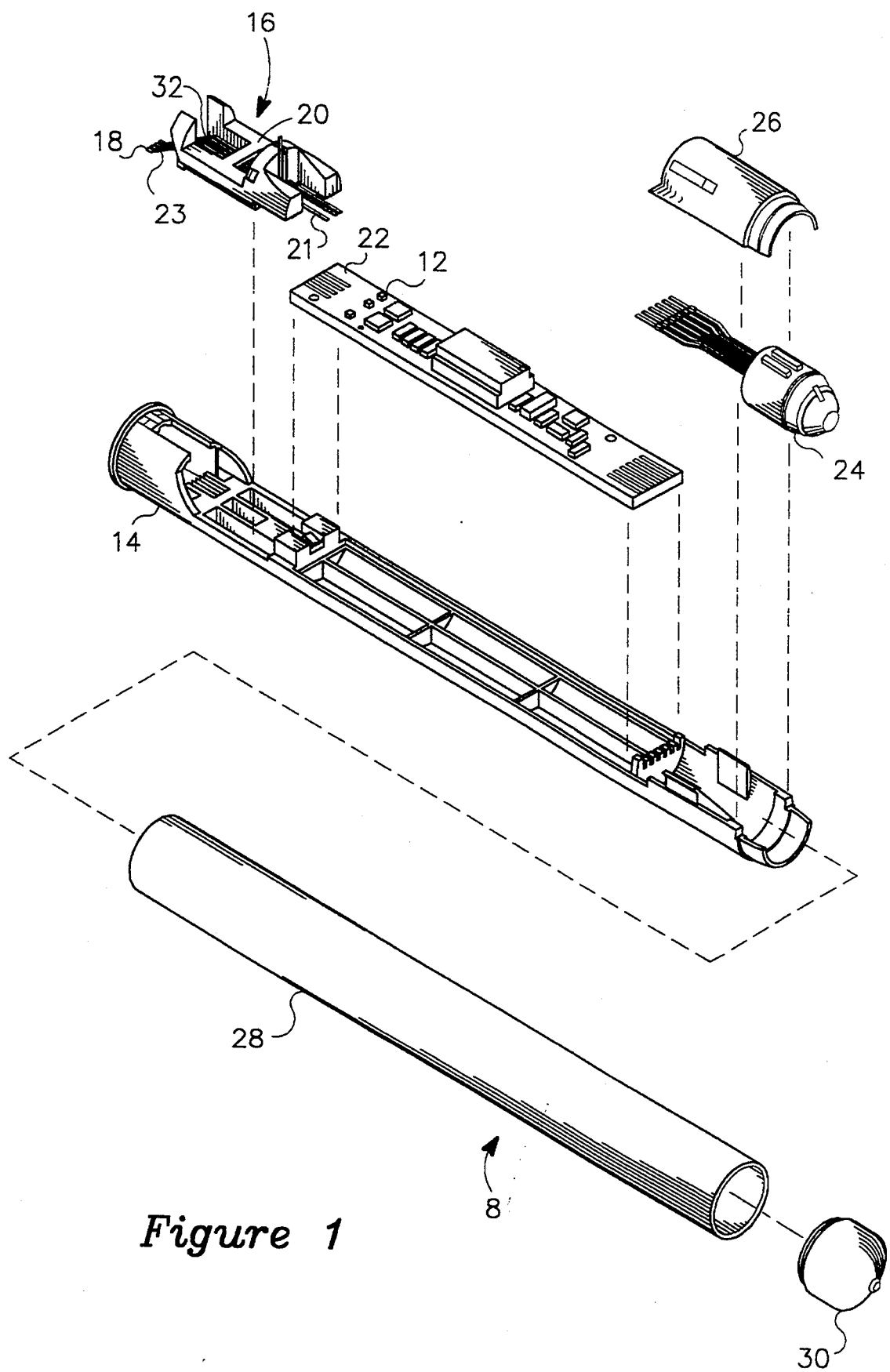
FIG. 1 is an exploded isometric view of a bar code scanner including the present invention.

As seen in FIG. 1, a bar code scanner 8 made according to the present invention includes a contact assembly 16 that is mountable on a scanner chassis 14. The contact assembly 16 has a plurality of wires 18 retained by a wire support member 20. A circuit end 21 of the wires 18 mates with a plurality of connection slots 22 formed in one end of a circuit board 12 containing internal circuitry of the bar code scanner 8. A receptacle end 23 of the wires 18 combines with the scanner chassis 14 to form a female receptacle 48 shown in FIG. 5.

As shown in FIG. 1, an optical assembly 24 is connected to an end of the circuit board 12 opposite the slots 22. The optical assembly 24 is carried by the scanner chassis 14 and then covered by a scanner chassis cover 26. When the contact assembly 16, circuit board 12, optical assembly 24, and chassis cover 26 are in place on the scanner chassis 14, the scanner chassis is inserted into a scanner casing 28 to provide cover for the entire assembly. A scanner tip 30 is inserted into one end of the scanner casing 28 to protect the optical assembly 24 while allowing light from the bar code being read to be received by the optical assembly. As will be recognized from FIG. 1, the parts of the scanner are modular in form and are assembled linearly and consecutively. This linearity allows the assembly to be accomplished by automated equipment.

Figure 2:
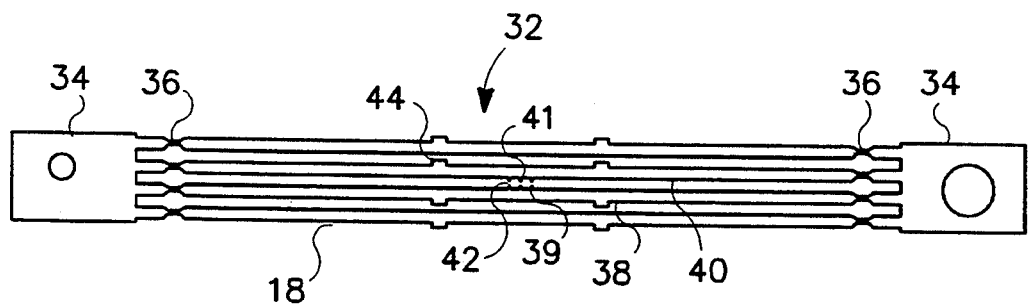
FIG. 2 is an enlarged side view of a wire assembly used in the scanner of FIG. 1 before being assembled into a contact assembly.

As shown in FIG. 2, the wires 18 include a casing ground wire 38 and an adjacent logic ground wire 40. The casing ground wire 38 includes a number of protrusions 39 extending towards corresponding protrusions 41 of the logic ground wire 40. These protrusions form a spark gap 42 therebetween by shortening the distance between the chassis ground wire 38 and the logic ground wire 40 so that any arcing that occurs therebetween will be confined to the spark gap 42. As discussed more fully below, the casing ground wire 38 is grounded to the scanner casing 28 so that any arcing will occur between logic ground wire 40 and casing ground wire 38 rather than between those of the wires 18 that carry information. The protrusions 39 and 41 should allow the adjacent casing ground and logic ground wires 38 and 40 to be close enough to each other to allow arcing when an electrical surge is present on either line, but not so close so as to allow arcing under normal current conditions.

Figure 3:
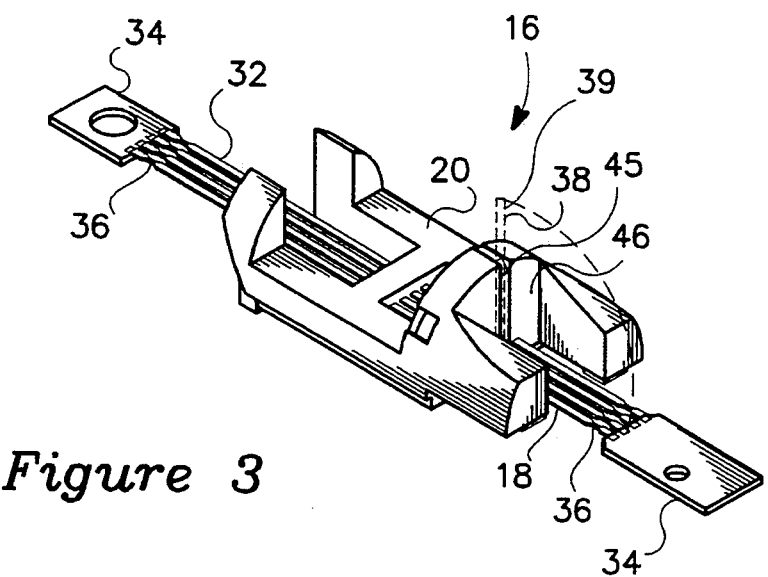
FIG. 3 is an enlarged isometric view of a contact assembly used in the scanner of FIG. 1.

In a preferred embodiment, the wires 18 of wire assembly 32 each have a pair of side tabs 44 extending laterally therefrom as shown in FIG. 2. The side tabs 44 engage with the interior of the wire support member 20 to firmly retain the wires 18 when incorporated into the contact assembly 16 as shown in FIG. 3. The wires 18 may be incorporated into the contact assembly 16 by various methods as long as the wire support member 20 securely retains the wires. Preferably the wires are molded into the wire support member so that interior compartments are formed in the contact assembly to engage the side tabs 44 and prevent axial movement of the wires 18 relative the contact assembly. Alternatively, one may use a two-piece contact assembly with preformed compartments that snaps together around the wires and engages the side tabs 44 to securely hold the wires in place.

As shown in FIG. 2, the wires 18 are in the form of a wire assembly 32 which has the wires 18 extending between and connected to tab ends 34. The tab ends 34 may be of the same material as the wires 18 such that the wire assembly 32 may be stamped from a single piece of metal. Alternatively, the wires may be separately formed and then molded into tab ends 34 made of plastic. Under either alternative, each of the wires includes breakaway junctions 36 formed at the junction of the tab ends 34 and the wires 18. The breakaway junctions 36 are sections of reduced width that allow the tab ends 34 to be easily removed from the wires 18 by bending at the breakaway junctions. The tab ends 34 provide a convenient way to handle the wire assembly 32 during assembly of the contact assembly 16, but are easily broken off to allow secure connection of the wires 18 to the circuit board 12.

Figure 4:
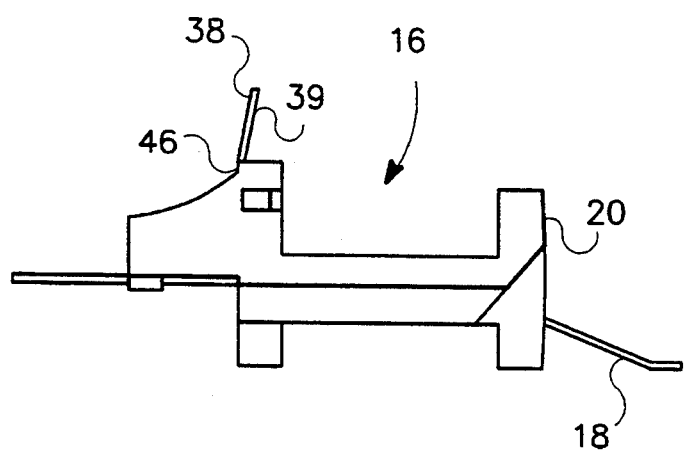
FIG. 4 is a side view of the contact assembly of FIG. 3.

Once the wires 18 are securely in place in the wire support member 20, as shown in FIG. 3, the tab ends 34 are snapped off at the breakaway sections 36. After the tab ends 34 are removed, one end portion 39 of the casing ground wire 38 is bent upward as viewed in FIG. 3 until it is in position in a recess 45 in a side wall 46 of the wire support member 20. This allows the casing ground wire 38 to come in secure contact with the scanner casing 28 when the contact assembly 16 is mounted in the scanner chassis 14 and the chassis positioned within the scanner cover 28 which occurs when the scanner 8 is fully assembled. The end portion 39 of the casing ground wire 38 is of sufficient length so that contact between the scanner casing 28 and the end portion of the casing ground wire bends the end portion, thereby producing a spring tension in the end portion. This spring tension ensures a secure contact between the end portion of the casing ground wire and the scanner casing. Side wall 46 prevents the casing ground wire 38 from being overbent by the scanner casing 28 when the contact assembly 16 is inserted into the scanner casing 28. If the casing ground wire 38 did not have the side wall 46 to support it, the casing ground wire 38 may be overbent and fail to make a secure contact with the scanner casing 28. FIG. 4 shows the contact assembly 16 after the ground wire 38 has been bent upward, but before insertion into the scanner casing 28.

Figure 5:
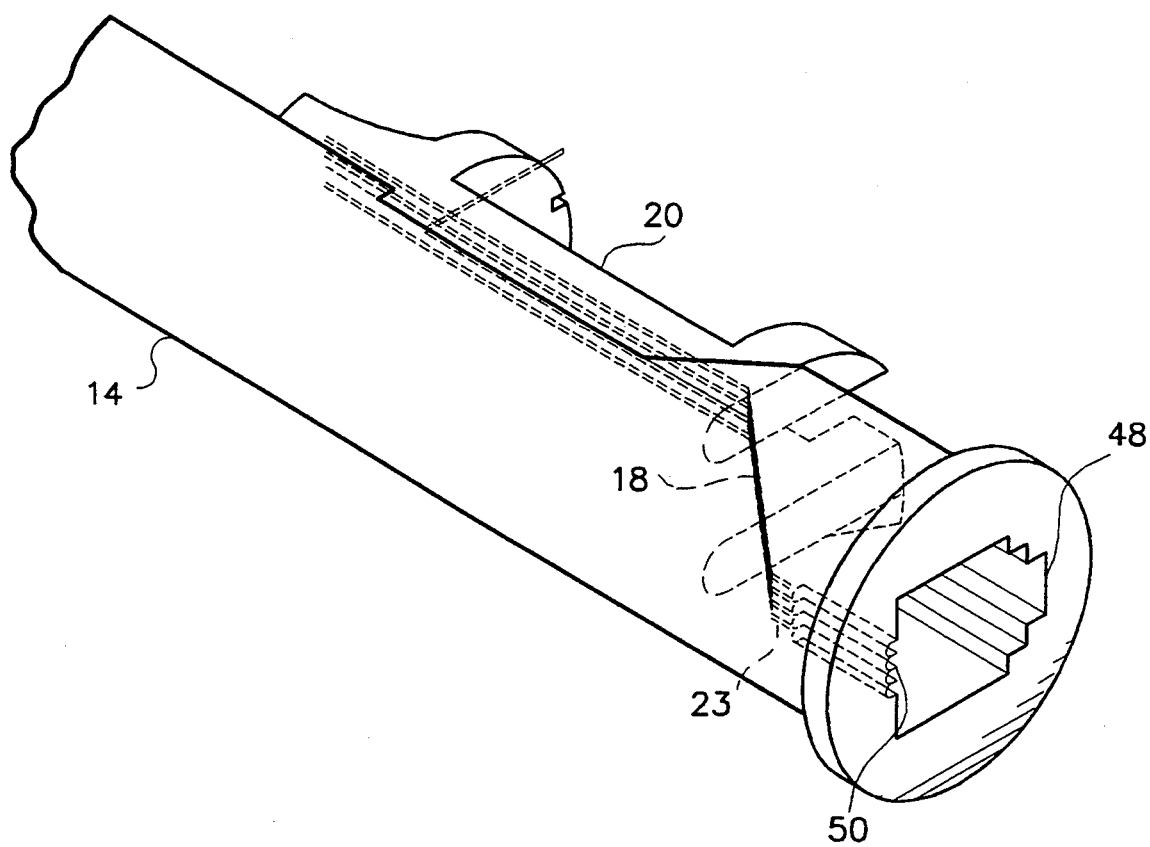
FIG. 5 is an enlarged isometric view of a scanner casing, including a female RJ-type connector, used in the scanner of FIG. 1.

The receptacle end 23 of each of the wires 18 is bent downward as shown in FIG. 4. The downward angled receptacle end 28 of the wires 18 allow the formation of the female receptacle 48 in conjunction with the scanner chassis 14. As best shown in FIG. 5, the female receptacle 48 of the scanner chassis 14 is positioned for receiving an external connector plug (not shown). Preferably, receptacle 48 is of the RJ-type female commonly used for telephone connections, with the downward bent wires 18 extending into slots 50 formed in the scanner chassis 14. While female receptacle 48 may be of any type, the RJ-type allows assembly simply by laying contact assembly 16 in place on the scanner chassis 14. This simple design provides significant cost savings by allowing assembly by automation rather than expensive hard labor.

It should be recognized that the order of assembly of the contact assembly 16 can be varied. For instance, one may bend the receptacle end 23 of the wires 18 downward before or after the tab ends 34 are removed. In addition, one may bend the end portion 39 of the casing ground wire 38 upward before the tab ends 34 are removed from the other wires, simply by disconnecting the casing ground wire from the tab end 34 to which it is initially attached. Alternatively, the wire assembly 32 may be made with only one tab end 34 without departing from the invention. However, for maximum stability and ease of assembly, two tab ends 34 should be used and the end portion 39 of the casing ground wire 38 should be bent upward after disconnection from the tab end 34.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A connector for a bar code scanner, comprising:
 a tubular scanner casing;
 a wire support member positioned within the scanner casing; and
 a plurality of wires retained by the wire support member, the wires extending longitudinally with respect to the scanner casing, one of the wires being a ground wire with an end portion that is bent such that the end portion of the ground wire contacts the scanner casing.

2. The connector of claim 1 wherein the wire support member includes a side wall positioned radially with respect to the scanner casing and adjacent the end portion of the ground wire so that the side wall prevents the end portion of the ground wire from being overbent so as to lose contact with the scanner casing.

3. The connector of claim 1 wherein the end portion of the ground wire is longer than the distance between the remainder of the ground wire and the scanner casing such that the scanner casing bends the end portion of the ground wire and produces a spring tension therein.

4. The connector of claim 1, further including a scanner circuit assembly and wherein a first end of each of the plurality of wires except for the ground wire, contacts connection points on the scanner circuit assembly such that an electric connection is established from the scanner circuit assembly to a second end of each of the plurality of wires.

5. The connector of claim 1, further including a scanner chassis having a connection end wherein an end of the plurality of wires extends into the connection end such that the wires and the connection end form an electrical receptacle.

6. The connector of claim 1 wherein each of the plurality of wires includes a side tab extending laterally therefrom, the side tabs engaging with the wire support member to retain the plurality of wires in the wire support member.

7. The connector of claim 1 wherein the plurality of wires includes a first wire adjacent a second wire, the first wire having a lateral protrusion extending toward the second wire so as to form a spark gap between the protrusion and the second wire.

8. The connector of claim 7 wherein the second wire has a lateral protrusion extending toward the lateral protrusion of the first wire so as to form a spark gap between the protrusions.

9. The connector of claim 5 wherein the receptacle formed is a female RJ-type receptacle.

10. A method of constructing a contact assembly for a bar code scanner connector, comprising:
  retaining a wire assembly in a wire support member, the wire assembly including a tab end connecting a plurality of wires together;
  breaking off the tab end
  bending one of the plurality of wires radially outward from the wire support member; and
  placing a scanner casing over the wire support member such that the scanner casing contacts the wire that was bent up.

11. A method of constructing a contact assembly for a bar code scanner connector, comprising:
  retaining a wire assembly in a wire support member, the wire assembly including a tab end connecting a plurality of wires together;
  breaking off the tab end;
  forming a plurality of slots in one end of a scanner chassis of the bar code scanner;
  bending one end of each of the plurality of wires; and
  inserting the bent ends into the slots.

* * * * *